INVENTOR
*Oscar Vilhelm Plym*

BY
*[signature]*
his ATTORNEY

United States Patent Office 2,941,570
Patented June 21, 1960

2,941,570

METHOD AND APPARATUS FOR MAKING TUBES AND HOLLOW BODIES OF FIBROUS PLASTICS

Oscar V. Plym, 27 Kristinegatan, Sater, Sweden

Filed Nov. 28, 1956, Ser. No. 624,782

Claims priority, application Sweden Nov. 29, 1955

12 Claims. (Cl. 154—1.8)

This invention relates to a method and a device for producing tubes and other hollow bodies of fibrous plastices, particularly glass fiber plastics, in which a fiber mat or fabric is applied onto a flexible carrier, said mat being coated or impregnated, before, during, or after this application, with a liquid plastic (synthetic resin) of suitable type. The main object of the invention is to provide a method of the kind in which an inflatable hollow member of soft or flexible material, such as rubber, is applied onto the fiber mat, and the longitudinal edges of said carrier are put together so as to cause this carrier and the fiber mat enclosed therein to encircle a cavity in which the inflatable member is inflated, so as to press against the interior walls of the cavity causing the plastic to effectively penetrate into the fiber mat and to form a tubular shell therewith, which will solidify in connection with the curing of the plastic with or without heating. After the layer of plastic and fibers has solidified to a sufficient extent, the air is released from said hollow member, allowing this to be withdrawn.

One object of the method according to the invention is to avoid the use of permanent molds and thus to provide for inexpensive manufacture.

A further object of the invention is to produce tubes having an optional cross sectional shape, such as circular, oval, more or less flattened, and so on. The tubes may be substantially cylindrical or conical with a rectilinear or curved generatrix. Also combinations of these forms may be contemplated. In certain cases it is necessary that the carrier is elastic to a certain extent.

A further object of the invention is to provide means for carrying the method into effect comprising two bars or rails extending in the longitudinal direction of the tube to be produced and adapted to maintain the longitudinal edges of said carrier close together, the said bars or rails being adapted to move said longitudinal edges from a position in which they are spaced from one another, into a position in which they lie close to each other and are clamped between the said bars or rails. After the plastic material and the flexible hollow member have been inserted into position, adjoining longitudinal edges of the carrier are put together and locked in this position until the tube produced from the mat and the plastic material has solidified to a sufficient degree.

A still further object of the invention is to provide a method and an apparatus for producing said tubes continuously.

Some embodiments of an apparatus for performing the invention are shown diagrammatically in the accompanying drawings in which.

Figure 1:
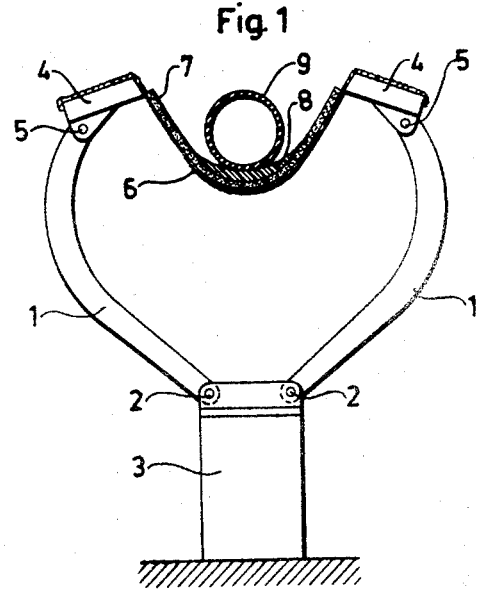
Figure 1 shows the bars or rails separated from one another in order to enable the introduction of fiber mat, plastic, and hollow member.
Figure 2:
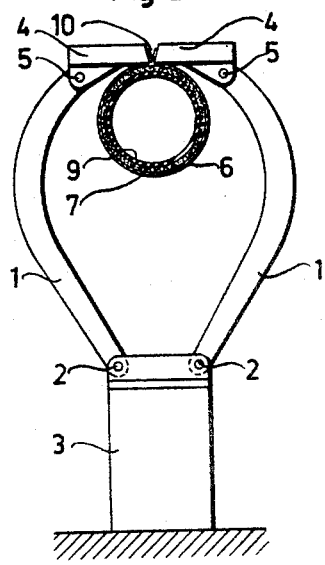
Figure 2 shows the bars in effective position.
Figure 3:
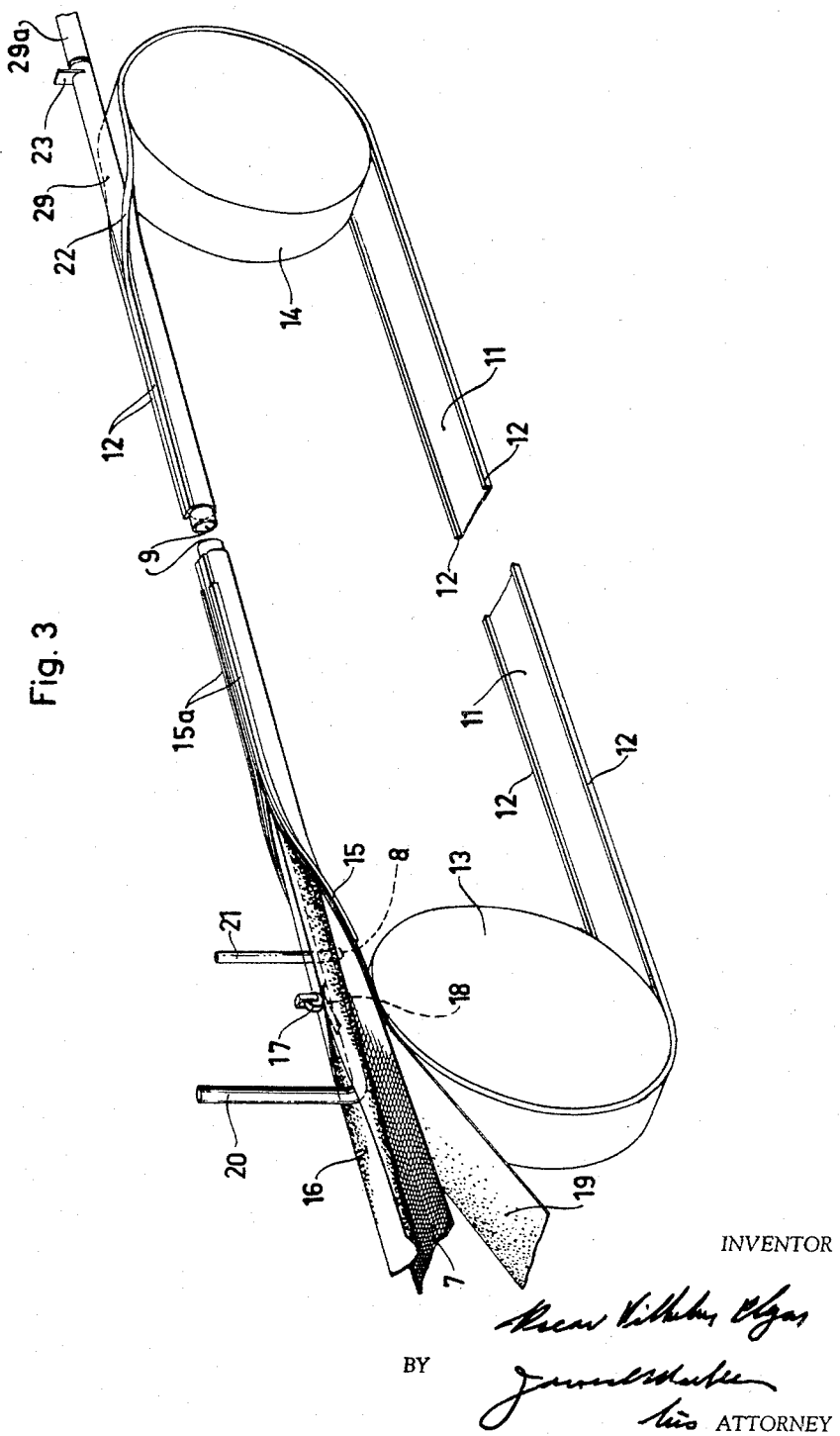
Figure 3 shows diagrammatically a perspective view of a machine for continuous production of tubes according to the invention.
Figure 4:
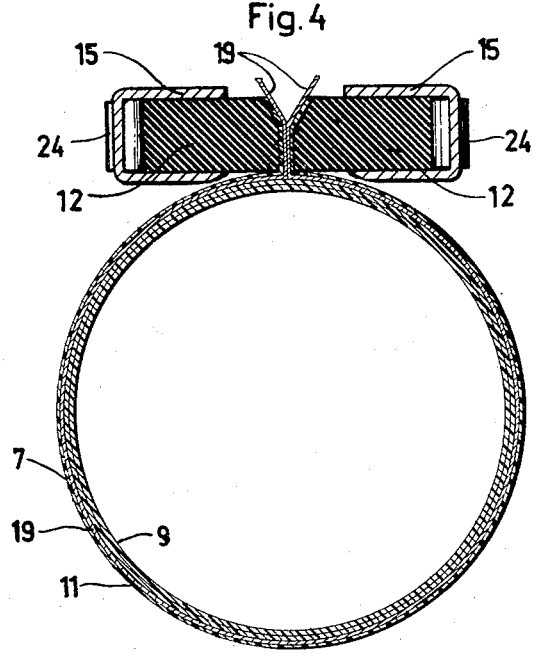
Fig. 4 is a cross-section of the tube on a greater scale and illustrates one stage of the manufacture.
Figure 5:
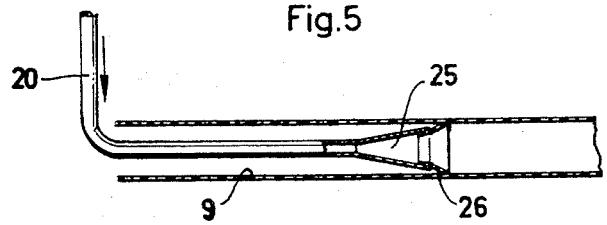
Fig. 5 illustrates a longitudinal section of the hollow member and shows a conduit for the supply of compressed air into the hollow member.
Figure 6:
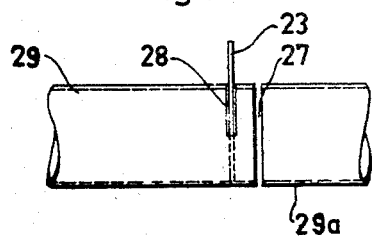
Fig. 6 shows part of the tube produced in the machine according to Fig. 3
Figure 7:
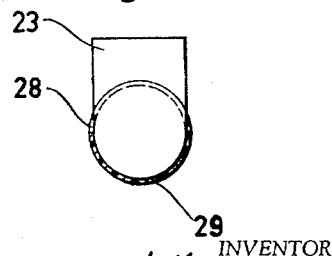
Fig. 7 is an end view of a detail of Fig. 6.

The apparatus according to Figs. 1 and 2 generally comprises two arms or shanks 1 pivotally mounted on pivots 2 at a support or base 3, said arms or shanks preferably having a somewhat curved shape. A suitable number of such pairs of arms are provided lengthwise along base 3. At the top end, arms 1 carry rails or bars 4, extending longitudinally of base 3 and being, for instance, pivoted on pivots 5 at arms 1. However, bars 4 may also be slidable toward and away from each other, and in such a case the pivotable arms 1 may possibly be dispensed with and replaced by a suitable frame.

In the manufacture of the desired tube, a carrier or web 6 is first cut out of a flexible, strong, and tight material, such as paper, so that the carrier obtains the same length as the contemplated tube and a width somewhat exceeding the length of the circumference of the tube ($2\pi.r$). The carrier 6 is attached in a suitable manner to bars 4 along its longitudinal edges, as illustrated in Figure 1, so that the width of the carrier, freely hanging down from the edges of the bars, corresponds to the circumferential length of the tube to be produced. If it is desired to produce a conical tube or a tube with a diameter varying along the length of the tube, carrier 6 is cut out correspondingly so that its width at each point lengthwise of the carrier will correspond to the desired circumference of the tube at this point. When certain shapes of the desired tube are concerned, the bars must have a curved configuration (as viewed in a longitudinal section) which may be accomplished by arranging some of arms 1 at a higher level than the others. The tube will then obtain a curving envelope surface.

The carrier 6 may, for instance, consist of paper or other flexible material, such as different kinds of foils, acetate or viscose films, impregnated fabric, thin sheet metal or plastic (synthetic resin) etc. The attaching of the edges of the carrier 6 to the bars 4 may also be performed in various ways, for instance by clamping means of a suitable type or simply by means of an adhesive tape.

After carrier 6 has been secured, a reinforcement in the form of a glass fiber mat 7 or other fiber mat or fabric is introduced, having the same length as the tube to be produced and the same width as the circumference of said tube at every point. As a reinforcement thus also may be used a hose woven of glass filaments or other filaments in a continuous process. The introducing of the mat or fabric 7 should preferably take place when the bars 4 are spaced to a certain extent. Before introducing, the mat 7 may be impregnated with plastic, or else a suitable quantity of plastic 8 may be poured on to the fiber mat after the mat has been put into position. Another possibility is to introduce the plastic, for instance through special openings or ducts, from the outer side of the mat after the hollow member, mentioned below, has been brought into position and the edges of the carrier put together. The plastic may be of various types but preferably plastic substance of ester type is employed, being in liquid state and of a type suitable for laminating, and which can be caused to polymerize very rapidly, either by heat or at room temperature, and generally having an accelerator and a peroxide catalyst added thereto.

A hollow member 9 of flexible material, say rubber or plastic, is now applied to the "mold" formed by carrier 6. The member 9 extends along the whole length of the mold and in uninflated condition it may have the same or a smaller or greater diameter than the inner diameter of the contemplated tube. In view of the fact that there may arise certain difficulties to cure the plastic material when applied on certain materials, such as rubber, it is suitable to interpose a separation film, for instance of waxed paper or the like, between the member 9 and the mat 7. This separation film will make the interior surface of the tube even and smooth, particularly when a hollow member is used having a greater diameter than the inner diameter of the tube. The separation film may be removed from the finished tube. Instead of using one member 9, use may be made of a plurality of hollow members if the total cross sectional area is sufficiently great for the purpose.

After having introduced the hollow member 9, arms 1 may be put together so as to cause bars 4 to occupy a position close together, as illustrated in Figure 2, in which they are kept together by means of suitable elements, whereupon member 9 is inflated by means of compressed air or gas or liquid. In doing so the plastic 8 is pressed upwardly through the glass fiber mat 7 so as to penetrate the mat under pressure, and at the same time air and excess of plastic material may escape through the slight opening 10 between bars 4. After the plastic has been forced out through this opening along the whole length of the tube, the plastic has completely impregnated the glass fiber mat. The plastic is allowed to solidify at room temperature or possibly under heat, whereupon the air pressure in the hollow member 9 is released so that the member may be withdrawn and the finished tube loosened from carrier 6, which preferably is prepared in such a manner that it will not adhere to the plastic.

An interior layer of paper or a similar separating film is suitably applied within the carrier 6 and the edges of this interior layer may protrude outside opening 10 in order to prevent excessive plastic, if any, from pouring down over bars 4. Said interior layer may possibly remain on the finished tube when said tube is removed from the mould. The outer layer forming the carrier or web 6, however, may preferably remain on bars 4 so as to be ready for a subsequent manufacturing operation.

The rigidity of hollow member 9 can vary in different portions of the same, so that, in inflated condition the member will obtain a configuration differing from the circular cross sectional shape, in case it is desired to produce tubes of non-circular cross sectional shape.

A slight polishing of the spots where the plastic material has been squeezed out between the bars is the only operation required for finishing the tube, and the tube will then constitute a light and strong product which among other things may be utilized for masts or tubular bars of various kinds, but also as line pipes, evacuation ducts, construction elements for electrical and chemical purposes, etc.

The process may also be performed continuously. A suitable machine for this purpose is illustrated in Figs. 3 to 7. According to this embodiment an endless belt 11 having edge bars or ribs 12 runs around two pulleys 13, 14, of which at least one is power driven. At a suitable place in the path of belt 11 there are provided guides 15 shaped so as to push the edge bars 12 together while folding the belt 11 so that the latter will form a mold casing in which the aforesaid fiber mat or fabric 7 and the hollow member 9 are introduced and shaped, and if desired a separation web or film 19, for instance of cellulose acetate or viscose film or the like, may be interposed between the mat 7 and the belt 11. If desired the hollow member 9 may be produced continuously of a suitable web of material 16, say soft plastic or the like, the longitudinal edges of which are brought together by means of guiding and shaping means not shown whereupon said edges are welded or glued together, for instance by means of a roller 17 and a support 18 arranged in the interior of the hose, and if necessary, under the action of heat so that the hollow member 9 will be formed. Into this member 9 a pipe 20 projects for the supply of compressed air. Plastic material 8 is supplied between the mat 7 and the belt 11 or the separation film 19, respectively, through a pipe 21.

The guides 15 are extended by straight guides 15a having a sufficient length for enabling the tube 29 formed by the mat 7 and the plastic 8 to stabilize into solid state before it leaves the machine. Rollers 24 (Fig. 4) are provided which engage the bars 12 in the guides 15, 15a in order to reduce the friction. The longitudinal edges of the mat 7 are folded together to a slightly overlapping position by means of the mold casing formed by belt 11 maintaining its shape by means of the bars 12, and the plastic material 8 which is supplied below the mat 7 will be pressed into the latter under the action of the pressure from the member 9.

At its other end the guides 15a are connected to curved guides 22 which separate the edge bars 12 of the belt 11 from each other so as to release the separation film 19, while the tube 29 composed of the mat 7 and the plastic material 8 will proceed together with its core or hollow member 9. Cutting of tube 29 is effected by making an incision 28 (Fig. 6) at a suitable place through half the diameter of the tube 29, and in the slot thus formed there is introduced a shut-off disc 23 which shuts off the tube 29 and the hollow member 9 so that no sugstantial quantities of compressed air will leak out this way, whereupon the tube 29 is severed at 27 immediately behind the incision 28. The shut-off disc 23 at the other end of the severed tube 29a may be removed and used again. Compressed air is supplied in excess so that a small leakage at the incision 28 will be of no importance.

The machine now described may also be combined with a continuously operating machine for weaving the mat 7 in the shape of a hose.

The end 25 of the air supply pipe 20 may, if desired, be made of conical shape and may have an extension of rubber 26 or the like which under the action of the compressed air will be forced towards the interior walls of the hollow member 9 so as to prevent unnecessary leakage of air. The member 9 may be withdrawn from the finished tube 29a or may remain therein.

Particular guides (not shown) may be provided for varying the shape of the casing or belt 11 so as to suit to the desired cross-sectional shape of the tube 29, 29a.

The belt 11 forming a casing may be subjected to vacuum to facilitate penetration of the plastic material through the mat 7.

What I claim is:

1. A method of producing tubular bodies of fiber plastic material inclusive of glass fiber plastics, comprising the steps of applying a fiber web onto a flexible supporting sheet, applying liquid plastic material onto said web, applying an inflatable tubular hollow member of soft material on said fiber web, closing said supporting sheet around said tubular hollow member so as to bring opposite edges of said fiber web into abutting relation to each other, inflating said tubular hollow member so as to press said fiber web against the interior wall of the cavity formed by said closed supporting sheet, and curing the plastic material contained in the tubular space between the inflatable member and said wall.

2. A method of producing tubular bodies of fiber plastic material, comprising the steps of applying a fiber web onto a flexible supporting sheet, impregnating said web with a liquid plastic material, moving opposite edges of said sheet into abutting relationship around an inflatable tubular hollow member, applying pressure in said inflatable tubular hollow member so as to inflate it and press said impregnated fiber web against the interior wall of said supporting sheet, curing the plastic material enclosed between the inflatable member and said interior wall, and separating said opposite edges of said supporting sheet from each other so as to allow removal of the cured tube.

3. A method of producing tubular bodies of fiber plastic material, comprising the steps of applying a fiber web onto a flexible supporting sheet, applying liquid plastic material onto said web, applying a separating sheet of flexible material on said fiber material, applying an inflatable tubular hollow member of soft material on said separating sheet, closing said supporting sheet around said tubular hollow member so as to bring opposite edges of said fiber web into contact with one another, inflating said tubular hollow member so as to press said fiber web against the interior wall of the cavity formed by said closed supporting sheet, curing the plastic material enclosed in the tubular space between the inflatable member and said interior wall, and separating the cured tube from the sheet engaging its inner and outer surface respectively.

4. A method of producing tubular bodies of fiber plastic material, comprising the steps of applying a fiber web onto a flexible supporting sheet, applying liquid plastic material onto said web, applying an inflatable tubular hollow member of soft material on said web, wrapping said fiber web around said tubular hollow member so as to form a conical envelope causing the opposite free edges of said fiber web to come into abutting relationship to one another, inflating said hollow member so as to press said fiber web against the inner surface of said conical envelope, and curing the plastic material enclosed in the space between the inflatable member and said inner surface.

5. A method of producing tubular bodies of fiber plastic material, comprising the steps of applying a fiber web onto a flexible supporting sheet, continuously progressing said sheet together with said fiber web, applying liquid plastic material onto said web, applying an inflatable tubular hollow member on said fiber web, progressing continuously said tubular hollow member together with said fiber web, guiding parallel edges of said supporting sheet during progressing so as to wrap said sheet around the tubular hollow member to form a cavity, bringing opposite edges of said fiber web into abutment with one another, supplying compressed fluid into said inflatable tubular hollow member so as to press said fiber web against the interior wall of the cavity formed by said flexible supporting sheet, curing the plastic material in the tubular space enclosed between the continuously progressed inflatable hollow member and the supporting sheet, and separating said opposite edges of the supporting sheet for allowing removal of the cured tubular body.

6. A method of producing tubular bodies of fiber plastic material, comprising the steps of applying a fiber web onto a flexible supporting sheet, continuously progressing said sheet together with said fiber web, applying liquid plastic material onto said web, applying continuously an air-tight flexible sheet onto said web so as to progress together with the latter, guiding opposite parallel edges of said air-tight sheet so as to continuously bring them together, joining said parallel edges so as to obtain an inflatable tubular member, guiding opposite edges of said supporting sheet during progressing so as to bring them together for bringing opposite edges of said fiber web into abutment, supplying compressed fluid into said inflatable tubular member so as to inflate it for pressing said fiber web against the interior wall of the supporting sheet, curing the plastic material in the tubular space enclosed between the inflatable tubular member and said supporting sheet, and separating said edges of the supporting sheet for allowing removal of the cured tubular body.

7. A method according to claim 5, wherein the end of the tubular inflatable member is obturated opposite to the air supply end for preventing compressed fluid from leaking out from the tube.

8. An apparatus for producing tubes of fiber plastic material inclusive of glass fiber plastics, comprising in combination a flexible supporting sheet for supporting a fiber web, means for holding said supporting sheet along opposite edges so as to obtain a channel shaped cross section, an inflatable hollow member of soft material on said flexible supporting sheet, and means for bringing said opposite edges of the supporting sheet into abutting relationship in order to form a surrounding tubular envelope around said inflatable hollow member.

9. An apparatus according to claim 8, wherein said means for bringing the opposite edges of the supporting sheet into abutting relationship comprises movable arms supporting said holding means, and means for rocking said arms to and from each other.

10. An apparatus according to claim 8, wherein said means for holding the supporting sheet comprises bars extending longitudinally of said supporting sheet and pivotally mounted on said means which bring opposite edges of the supporting sheet into abutting relationship.

11. An apparatus for producing tubes of fiber plastic material, comprising in combination a flexible supporting sheet for supporting a fiber web, means for progressing said supporting sheet continuously, means for guiding opposite edges of said supporting sheet so as to shape said sheet to a channel shaped structure, an inflatable tubular hollow member of soft material, located on said flexible supporting sheet to be progressed together with the latter, means for guiding said opposite edges of the supporting sheet so as to bring them into abutting relationship, means for holding said edges in abutment during continued progressing so that said sheet will form a tubular envelope around said inflatable member, means for supplying liquid plastic material into said tubular envelope, and means for separating said abutting edges during continued progressing for allowing removal of the cured product.

12. An apparatus according to claim 11, comprising means for continuously producing said inflatable tubular hollow member, said means comprising a device for guiding opposite parallel edges of a continuously progressed air-tight soft sheet so as to bring them into engagement, and means for joining said edges continuously.

References Cited in the file of this patent
UNITED STATES PATENTS

| | | |
|---|---|---|
| 2,411,542 | Ilch | Nov. 26, 1946 |
| 2,460,820 | Hagopian | Feb. 8, 1949 |
| 2,489,387 | Roberts | Nov. 29, 1949 |
| 2,509,528 | Roberts | May 30, 1950 |
| 2,536,182 | Humphrey | Jan. 2, 1951 |
| 2,616,463 | Potchen | Nov. 4, 1952 |
| 2,649,133 | Just | Aug. 18, 1953 |
| 2,674,557 | Boggs | Apr. 6, 1954 |
| 2,678,677 | Hervey et al. | May 18, 1954 |
| 2,768,920 | Stout | Oct. 30, 1956 |